US012065332B2

(12) United States Patent
Mahesh et al.

(10) Patent No.: US 12,065,332 B2
(45) Date of Patent: Aug. 20, 2024

(54) STAIRCASE MOBILITY SYSTEM

(71) Applicant: HCL Technologies Limited, New Delhi (IN)

(72) Inventors: Mahesh, Bangalore (IN); Vadiraj Hubli, Bangalore (IN); Veeresh Somalingayya, Bangalore (IN); Sourav Dey, Bangalore (IN)

(73) Assignee: HCL Technologies Limited, New Delhi (IN)

(*) Notice: Subject to any disclaimer, the term of this patent is extended or adjusted under 35 U.S.C. 154(b) by 0 days.

(21) Appl. No.: 18/229,201

(22) Filed: Aug. 2, 2023

(65) Prior Publication Data

US 2023/0373756 A1 Nov. 23, 2023

Related U.S. Application Data

(63) Continuation of application No. 17/704,048, filed on Mar. 25, 2022, now Pat. No. 11,753,277.

(51) Int. Cl.
*B66B 9/08* (2006.01)

(52) U.S. Cl.
CPC .................................. *B66B 9/0807* (2013.01)

(58) Field of Classification Search
CPC ........ B66B 9/08; B66B 9/0807; B66B 9/0853
See application file for complete search history.

(56) References Cited

U.S. PATENT DOCUMENTS

| | | | | |
|---|---|---|---|---|
| 5,060,960 A * | 10/1991 | Branscumb | A61G 7/103 280/647 |
| 7,395,900 B2 * | 7/2008 | Murray | B66B 9/0869 187/202 |
| 11,304,865 B2 * | 4/2022 | Furman | A61G 7/08 |
| 11,753,277 B2 * | 9/2023 | Mahesh | B66B 9/0853 187/303 |
| 2008/0203775 A1 * | 8/2008 | Caroen | B66B 9/08 297/30 |

(Continued)

FOREIGN PATENT DOCUMENTS

| | | |
|---|---|---|
| CN | 214167048 U * | 9/2021 |
| DE | 29815306 U1 | 11/1998 |

(Continued)

OTHER PUBLICATIONS

K Navya, Smart Stair Lift for Disabled and Elderly, Jun. 2018 International Journal of Pure and Applied Mathematics 120(6):4647-4660 Project: Stair lift for disabled and elderly, Figures—uploaded by Prabhakara Rao Kapula, vol. 120 No. 6 2018, 4647-4660ISSN: 1314-3395 (on-line version)url: http://www.acadpubl.eu/hub.

*Primary Examiner* — Michael A Riegelman
(74) *Attorney, Agent, or Firm* — Kendal M. Sheets

(57) ABSTRACT

A staircase mobility system is disclosed. The system includes a docking assembly that is configured to dock or undock with a dockable seat assembly. The docking assembly includes support rods configured to engage or disengage with the dockable seat assembly when docked or undocked, respectively. Further, the system includes a drive assembly coupled to the docking assembly. The drive assembly includes a motor that is configured to drive the docking assembly along a guide rail in a forward or reverse direction, and to operate the docking assembly to dock or undock with the dockable seat assembly.

11 Claims, 6 Drawing Sheets

(56) References Cited

U.S. PATENT DOCUMENTS

| | | | | |
|---|---|---|---|---|
| 2008/0308357 | A1* | 12/2008 | Coble | B66B 9/0807 187/200 |
| 2013/0112505 | A1* | 5/2013 | Zuercher | B66B 9/04 187/200 |
| 2015/0107939 | A1* | 4/2015 | Ooms | B66B 9/0853 187/201 |
| 2020/0231411 | A1* | 7/2020 | Foggio, Jr. | B66B 9/0853 |
| 2020/0346897 | A1* | 11/2020 | Davis | B66B 9/083 |
| 2022/0315387 | A1* | 10/2022 | Mahesh | B66B 9/0807 |
| 2023/0145802 | A1* | 5/2023 | Stam | B66B 9/0838 187/201 |
| 2023/0373756 | A1* | 11/2023 | Mahesh | B66B 9/0807 |

FOREIGN PATENT DOCUMENTS

| | | | |
|---|---|---|---|
| EP | 2650247 | B1 | 9/2014 |
| IN | 202111014934 | A | 3/2021 |
| JP | 2006503776 | A | 10/2003 |
| JP | 2008514243 | A | 8/2005 |
| JP | 2010070331 | A | 9/2008 |
| JP | 2013245107 | A | 5/2012 |
| TW | M539925 | U | 4/2017 |

* cited by examiner

STAIRCASE MOBILITY SYSTEM

TECHNICAL FIELD

This disclosure relates generally to a staircase mobility system, and more particularly to staircase mobility system comprising a docking assembly that docks or undocks with a dockable seat assembly.

BACKGROUND

Stairlift is a safety-critical staircase mobility device that is installed on staircase for use by persons with reduced mobility. Typically, the stairlift suits persons who can walk on flat ground with minimum or little discomfort but find it difficult to climb the staircase. However, wheelchair bound persons may find it difficult to use the stairlift. To use the stairlift, a wheelchair bound person need to physically shift from the wheelchair to the stairlift. Additionally, the wheelchair needs to be physically moved to a location where the person deboards the stairlift. In some cases, when the mobility of a person deteriorates, the person may need to upgrade from using a stairlift to a wheelchair lift to go up the stairs. However, such transition may be expensive in nature. Moreover, two persons may have different mobility needs—one requiring stairlift while the other requiring wheelchair lift.

Therefore, it is desirable to provide an effective and efficient staircase mobility solution for easy mobility of people with reduced mobility in a safe and cost effective manner.

SUMMARY

In one embodiment, a staircase mobility system is described. The staircase mobility system may include a docking assembly configured to dock or undock with a dockable seat assembly. The docking assembly may include one or more support rods configured to engage or disengage with the dockable seat assembly when docked or undocked, respectively. Upon the one or more support rods being engaged, the one or more support rods may provide support and stability to the dockable seat assembly. The docking assembly may further include one or more dock connecters disposed along the one or more support rods. The one or more dock connectors may be configured to communicatively connect or disconnect with the dockable seat assembly when docked or undocked, respectively. When the one or more dock connectors are communicatively connected with the dockable seat assembly, the one or more dock connecters may facilitate transmission of control signals from the dockable seat assembly to the docking assembly. The staircase mobility system may further include a drive assembly coupled to the docking assembly. The drive assembly may include a motor operable by a power source. The motor may be configured to drive the docking assembly along a guide rail in a forward or reverse direction. The guide rail may be configured to be installed substantially parallel to at least one of an incline of a staircase or a flat ground. The motor may further operate the docking assembly to dock or undock with the dockable seat assembly.

In another embodiment, a dockable seat assembly for a staircase mobility system is disclosed. The dockable seat assembly may include a dockable base configured to dock or undock with a docking assembly of the staircase mobility system. The dockable base may include one or more compatible conduit to engage or disengage with one or more support rods of the docking assembly. The dockable base may further include one or more compatible dock connecters disposed along the one or more compatible conduit and configured to communicatively connect or disconnect with the one or more compatible dock connecters disposed along the one or more support rods. The dockable seat assembly may further include a seat disposed over the dockable base. The dockable seat assembly may further include a control pad accessible to a user occupying the seat. The control pad may include a plurality of input peripherals operable to generate control signals to drive the docking assembly to perform a plurality of corresponding operations. The plurality of corresponding operations include at least one of: driving the docking assembly along a guide rail in forward or reverse direction; and driving the docking assembly to dock or undock the dockable seat assembly.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
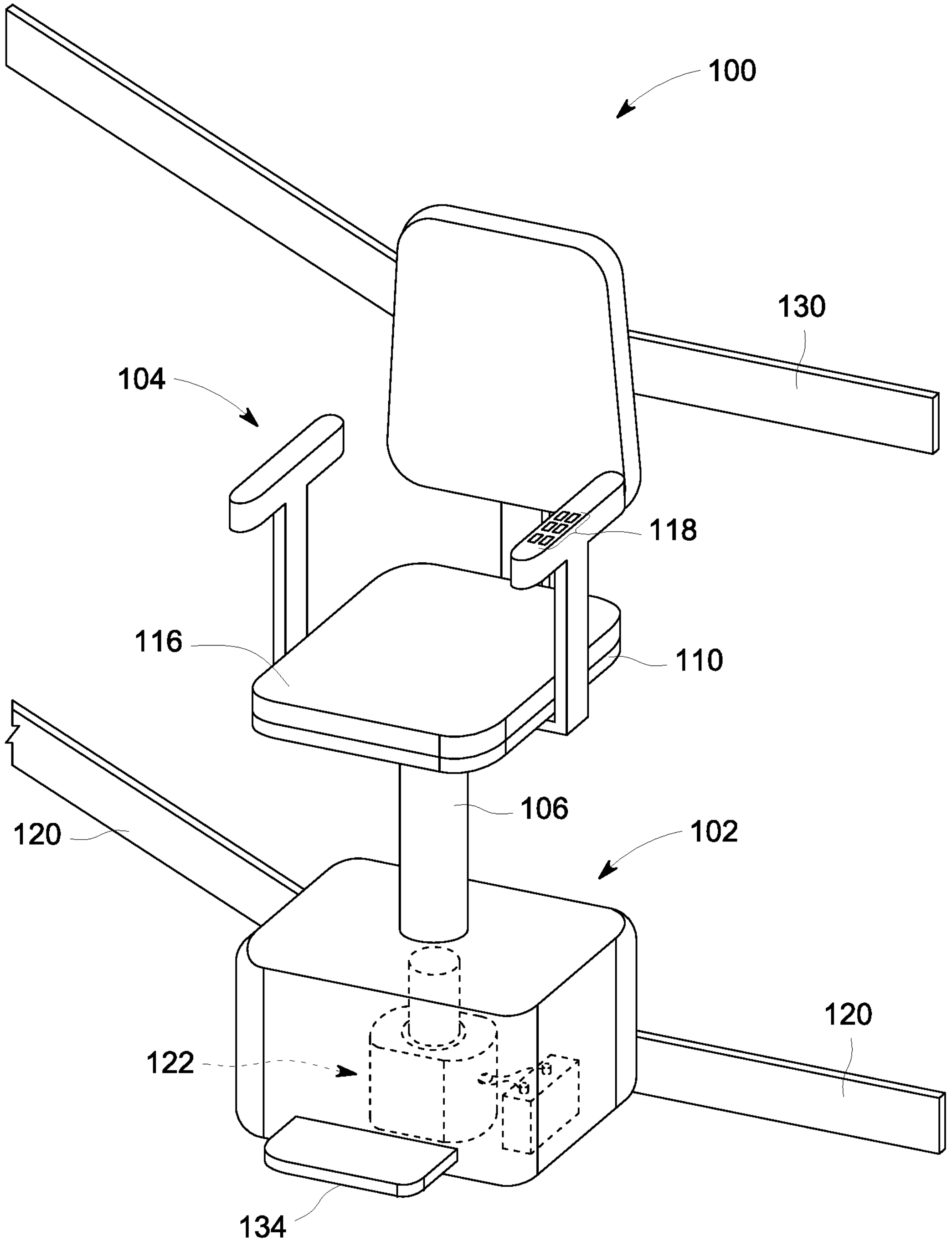
FIG. 1 illustrates a perspective view of a staircase mobility system, in accordance with an embodiment.

Referring now to FIG. 1, a perspective view of a staircase mobility system 100 is illustrated, in accordance with an embodiment. In some embodiments, the staircase mobility system 100 may include a docking assembly 102. The docking assembly 102 may be configured to dock or undock with a dockable seat assembly 104. The docking assembly 102 may include one or more support rods 106 configured to engage or disengage with the dockable seat assembly 104 when docked or undocked, respectively. When the one or more support rods 106 are engaged with the dockable seat assembly 104, the one or more support rods 106 may provide support and stability to the dockable seat assembly 104.

The docking assembly 102 may further include one or more dock connecters 108 (not shown in FIG. 1) disposed along the one or more support rods 106. The one or more dock connectors 108 may be configured to communicatively connect or disconnect with the dockable seat assembly 104 when docked or undocked, respectively. When the one or more dock connectors 108 communicatively connect with the dockable seat assembly 104, the one or more dock connecters 108 may facilitate transmission of control signals from the dockable seat assembly 104 to the docking assembly 102.

The dockable seat assembly 104 may include a dockable base 110 configured to dock or undock with the docking assembly 102. The dockable base 110 may include one or more compatible conduit 112 (not shown in FIG. 1) to engage or disengage with the one or more support rods 106. In particular, the one or more support rods 106 of the docking assembly 102 may slide in or out of the one or more compatible conduit 112 of the dockable base 110. The dockable base 110 may further include one or more compatible dock connecters 114 (not shown in FIG. 1) disposed along the one or more compatible conduit 112. The one or more compatible dock connecters 114 may be configured to communicatively connect or disconnect with the one or more dock connecters 108 disposed along the one or more support rods 106. The dockable seat assembly 104 may further include a seat 116 that may be disposed over the dockable base 110.

In an embodiment, the docking assembly 102 may further include one or more securing latches 132 (not shown in FIG. 1) disposed along the one or more support rods 106. The dockable base 110 may further include one or more compatible notches 136 (not shown in FIG. 1). The one or more securing latches may be configured to engage or disengage with the one or more compatible notches when docked or undocked, respectively.

The dockable seat assembly 104 may include a control pad 118 that may be accessible to a user occupying the seat 116. The control pad 118 may include multiple input peripherals that may be operable to generate the control signals to drive the docking assembly 102 to perform a plurality of corresponding operations. The plurality of corresponding operations may include at least one of following operation: (a) drive the docking assembly 102 along a guide rail 120 in a forward or a reverse direction, and (b) drive the docking assembly 102 to dock or undock the dockable seat assembly 104. In an embodiment, the dockable seat assembly 104 may be a dockable wheelchair assembly 104A (not shown in FIG. 1). The dockable wheelchair assembly 104A may further include a set of wheels 126 (not shown in FIG. 1). The set of wheels 126 may be configured to move the dockable wheelchair assembly 104A on the flat ground when not docked on the docking assembly 102 for easing the user mobility. Additionally, the plurality of corresponding operations may include raising a set of wheels 126 of the dockable wheelchair assembly 104A when docked to the docking assembly 102 and lowering the set of wheels 126 when undocked from the docking assembly 102.

The staircase mobility system 100 may further include a drive assembly 122 coupled to the docking assembly 102. In some embodiments, the drive assembly 122 may be disposed within the docking assembly 102 so as to form one integrated compact component of the staircase mobility system 100. The drive assembly 122 may include a motor 124 (not shown in FIG. 1) that is operable by a power source 128 (not shown in FIG. 1). The motor 124 may be configured to drive the docking assembly 102 along the guide rail 120 in forward or reverse direction. Further, the guide rail 120 may be configured to be installed substantially parallel to an incline of a staircase or a flat ground. Additionally, the motor 124 may operate the docking assembly 102 to dock or undock with the dockable seat assembly 104.

In an embodiment, the motor 124 may be configured to operate the docking assembly 102 to dock or undock by moving the one or more support rods 106 linearly within the one or more compatible conduit 112 to engage or disengage with the dockable seat assembly 104. Additionally, the one or more support rods 106 may be moved rotationally within the one or more compatible conduit 112 to engage or disengage with the dockable seat assembly 104. As may be appreciated, the support rods 106 may be moved rotationally so as to allow rotation of the dockable seat assembly 104, docked to the docking assembly 102, away from open stairs for a safer exit for the user from the staircase mobility system 100.

In an embodiment, the drive assembly 122 may be configured to drive the docking assembly 102 along the guide rail 120 based on one of: the control signals received from the dockable seat assembly 104 via the docking assembly 102, or remote control signals received from a remote control held by the user.

In an embodiment, a support rail 130 may be installed parallel to the guide rail 120 near the flat ground. The support rail 130 may support the dockable seat assembly 104 when it is undocked from the docking assembly 102. In another embodiment, the drive assembly 122 may temporarily suspend the docking assembly 102 to dock or undock with the dockable seat assembly 104 until the docking assembly 102 is on a portion of the guide rail 120 that is substantially parallel to the flat ground.

Figure 2:
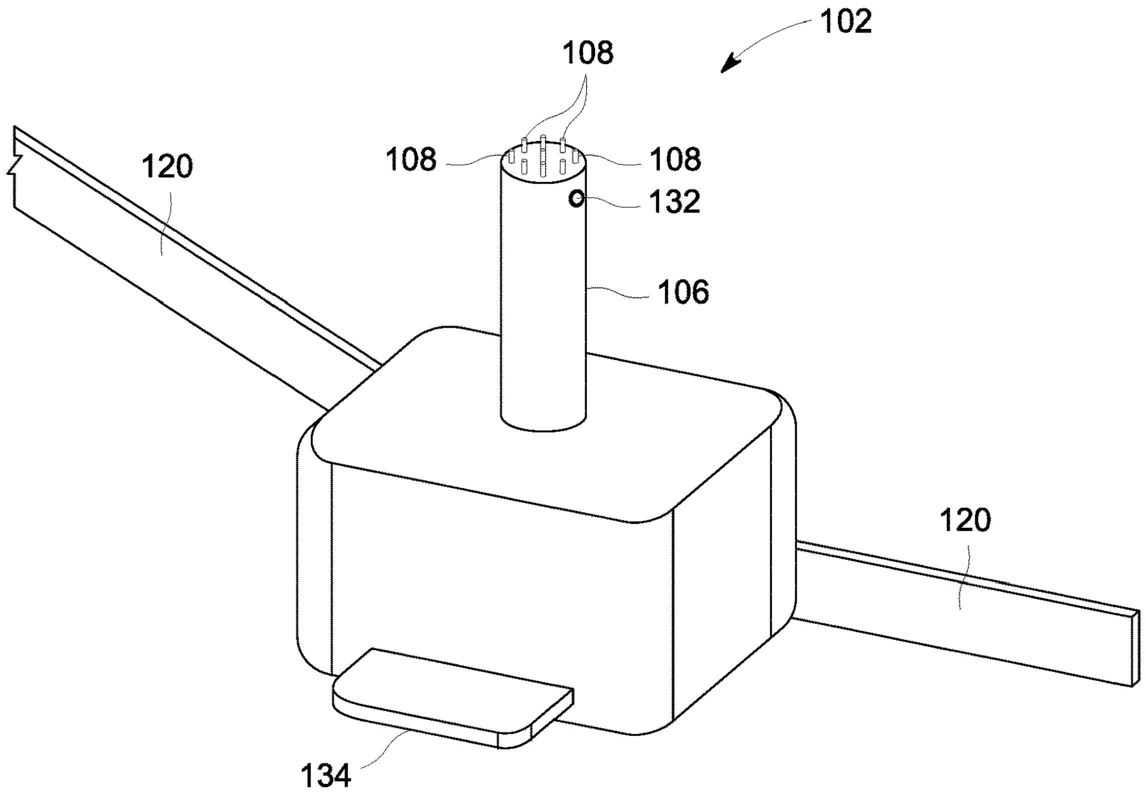
FIG. 2 illustrates a perspective view of a docking assembly, in accordance with an embodiment.

Referring now to FIG. 2 a perspective view of a docking assembly 102 is illustrated, in accordance with an embodiment. The docking assembly 102 may include one or more support rods 106. The one or more support rods 106 may be configured to engage or disengage with a dockable seat assembly 104 (not shown in FIG. 2) when docked or undocked respectively. When the one or more support rods 106 are engaged with the dockable seat assembly 104, the one or more support rods 106 may provide support and stability to the dockable seat assembly 104.

As an example, the one or more support rods 106 may be present either at a center position and/or on each corner of the docking assembly 102. The one or more support rods 106 may be slidably and/or rotatably supported in a tube. The tube may be disposed at a substantially ninety degree angle and attached to a drive assembly 122. It should be noted that the one or more support rods 106 may be completely or substantially retractable within the docking assembly 102. Thus, when not in use, the one or more support rods 106 may be pulled inside the docking assembly 102 for safety and aesthetics.

The docking assembly 102 may further include one or more dock connecters 108 disposed along the one or more support rods 106 and configured to communicatively connect or disconnect with the dockable seat assembly 104 when docked or undocked, respectively. When the one or more support rods 106 are communicatively connected with the dockable seat assembly 104, the one or more dock connecters 108 may facilitate transmission of control signals from the dockable seat assembly 104 to the docking assembly 102. Again, it should be noted that the one or more dock connecters 108 may be completely or substantially retractable within the one or more support bars 106. Thus, when not in use, the one or more dock connecters 108 may be pulled inside the one or more support bars 106 for safety and aesthetics.

By way of an example, the one or more dock connecters 108 may be represented as a plurality of engagement pins spaced from each other. When the support rods 106 moves upward or downward, the plurality of engagement pins may come in physical contact with a plurality of corresponding engagement members configured within the dockable seat assembly 104 so as to establish communication between the dockable seat assembly 104 and the docking assembly 102.

By way of another example, the one or more dock connectors 108 may be represented as a plurality of pins/contacts arranged in a plurality of rows (e.g., a plurality of first pins/contacts in a first row and a plurality of second pins/contacts in a second row). It should be noted that the multiple pins/contacts in each row may not be necessarily arranged on same lines in a vertical direction, but may be displaced in a left-right direction. When the support rods 106 moves upward or downward, the plurality of pins/contacts may come in physical contact with a plurality of corresponding members/contacts configured within the dockable seat assembly 104 so as to establish communication between the dockable seat assembly 104 and the docking assembly 102.

In another embodiment, the docking assembly 102 may further include one or more securing latches 132 disposed along the one or more support rods 106. Additionally, a dockable base 110 of the dockable seat assembly 104 may include one or more compatible notches 136 (not shown in FIG. 2). The one or more securing latches 132 of the docking assembly 102 may be configured to engage or disengage with the one or more compatible notches 136 of the dockable base 110 when docked or undocked, respectively. As may be appreciated, when the one or more securing latches 132 in the docking assembly 102 are engaged with the one or more compatible notches 136 in the dockable base 110 in a docked state, the docking assembly 102 and the dockable base 110 are tightly secured. Further, when undocked, the one or more securing latches 132 in the docking assembly 102 are disengaged with the one or more compatible notches 136 in the dockable base 110. It should be noted that, the forward or backward movement of the dockable seat assembly 104 along the guide rail 120, when docked to the docking assembly 102, may be suspended unless the securing latches 132 are engaged with the compatible notches 136 so as to prevent any mishap. Further, it should be noted that the one or more securing latches 132 may be completely or substantially retractable within the one or more support bars 106. Thus, when not in use, the one or more securing latches 132 may be pulled inside the one or more support bars 106 for safety and aesthetics.

Figure 3:
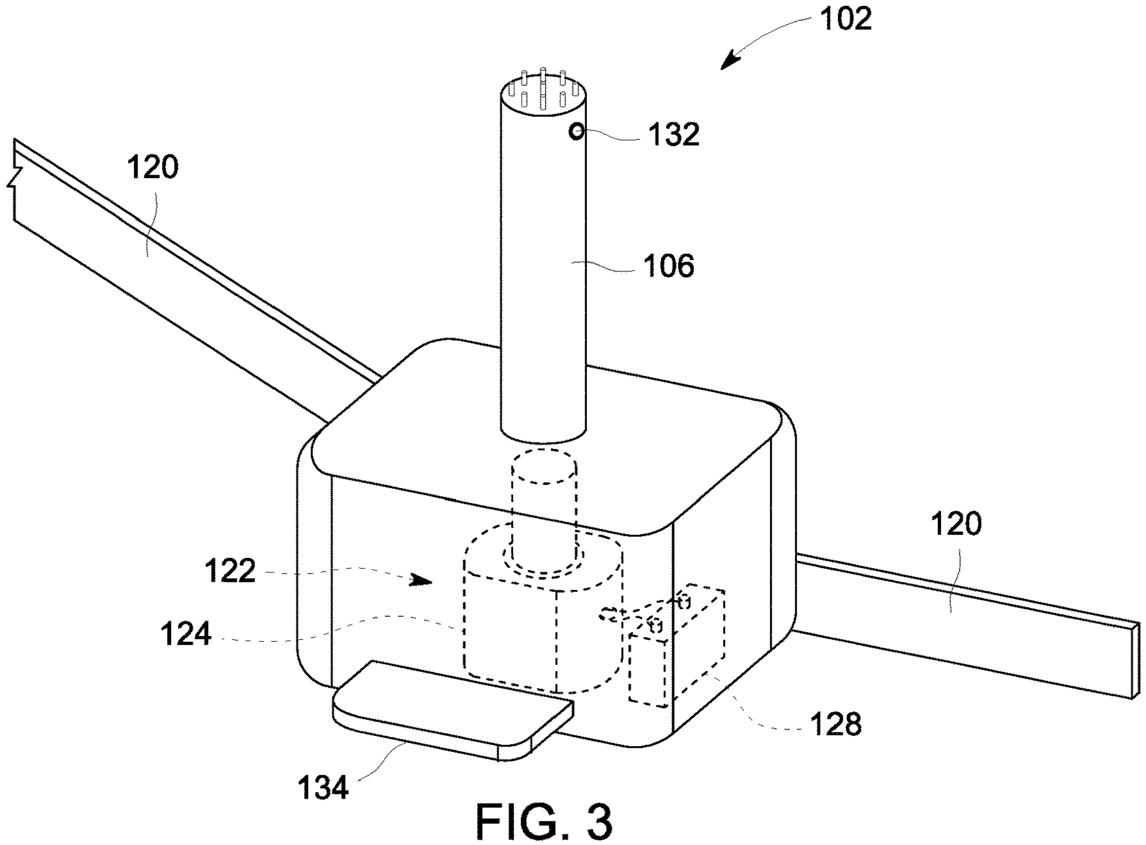
FIG. 3 illustrates a perspective view of a drive assembly, in accordance with an embodiment.

Referring now to FIG. 3 a perspective view of a drive assembly 122 is illustrated, in accordance with an embodiment. The drive assembly 122 may include a motor 124 that is operable by a power source 128. The motor 124 may be configured to drive the docking assembly 102 along a guide rail 120 in a forward or reverse direction. The guide rail 120 may be configured to be installed substantially parallel to at least one of an incline of a staircase or a flat ground. In other words, the flattened portion of the guide rail corresponds to a portion of the guide rail that is parallel to the flat ground, while the inclined portion of the guide rail corresponds to a portion of the guide rail that is parallel to the incline of the staircase. Further, the motor 124 may be configured to operate the docking assembly 102 to dock or undock with the dockable seat assembly 104.

As an example, the motor 124 may be a direct current (DC) motor where input electrical energy is direct electric current, and the input electrical energy is transformed into a mechanical rotation of a shaft of the DC motor. Operation of the motor 124 is powered by the power source 128, that may be powered by an external power supply (not shown) located at either or both extreme ends of the guide rail. As may be appreciated, in some embodiments, the power source 128 may be further equipped to operate with rechargeable batteries that may be constantly trickle-charged when the power source 128 is connected to the external power supply. If the external power supply gets disconnected from the power source 128, the rechargeable batteries may take over so as to operate the motor 124 within the drive assembly 122. In such embodiments, the external power supply may be in form of a charging station. It should be noted that, in some embodiments, the power source 128 may further power the control circuitry of the dockable seat assembly 104 when the dockable seat assembly 104 is docked with the docking assembly 102.

In an embodiment, the drive assembly 122 may be configured to drive the docking assembly 102 along the guide rail 120 upon either receiving control signals from the dockable seat assembly 104 (via the docking assembly 102), or upon receiving remote control signals from a remote control operated by a user of the staircase mobility system 100. As an example, the remote control signals may be generated from a remote control, operated by the user or an assistant, so as to automatically call or send the docking assembly 102 up and down the guide rail 120 when the user is located on a different floor than the docking assembly 102. This enables multiple users to utilize the staircase mobility system 100.

The docking assembly 102 may further include a footrest 134. The footrest may be linked to a lever and may be raised and folded using the lever. Alternatively, the footrest may be completely or substantially retractable within the docking assembly 102. In some embodiments, when the staircase mobility system 100 is not in use or when the dockable seat assembly 104 is undocked from the docking assembly 102, the footrest 134 may be folded or drawn back within the docking assembly 102. Similarly, in some embodiments, when the dockable seat assembly 104 is docked to the docking assembly 102, the footrest 134 may be unfolded or drawn out from the docking assembly 102. In some embodiments, the folding/unfolding or drawing in/out of the footrest may be achieved based on a control signal from the dockable seat assembly 104. The user generates the control signal by using the control pad 118.

Figure 4:
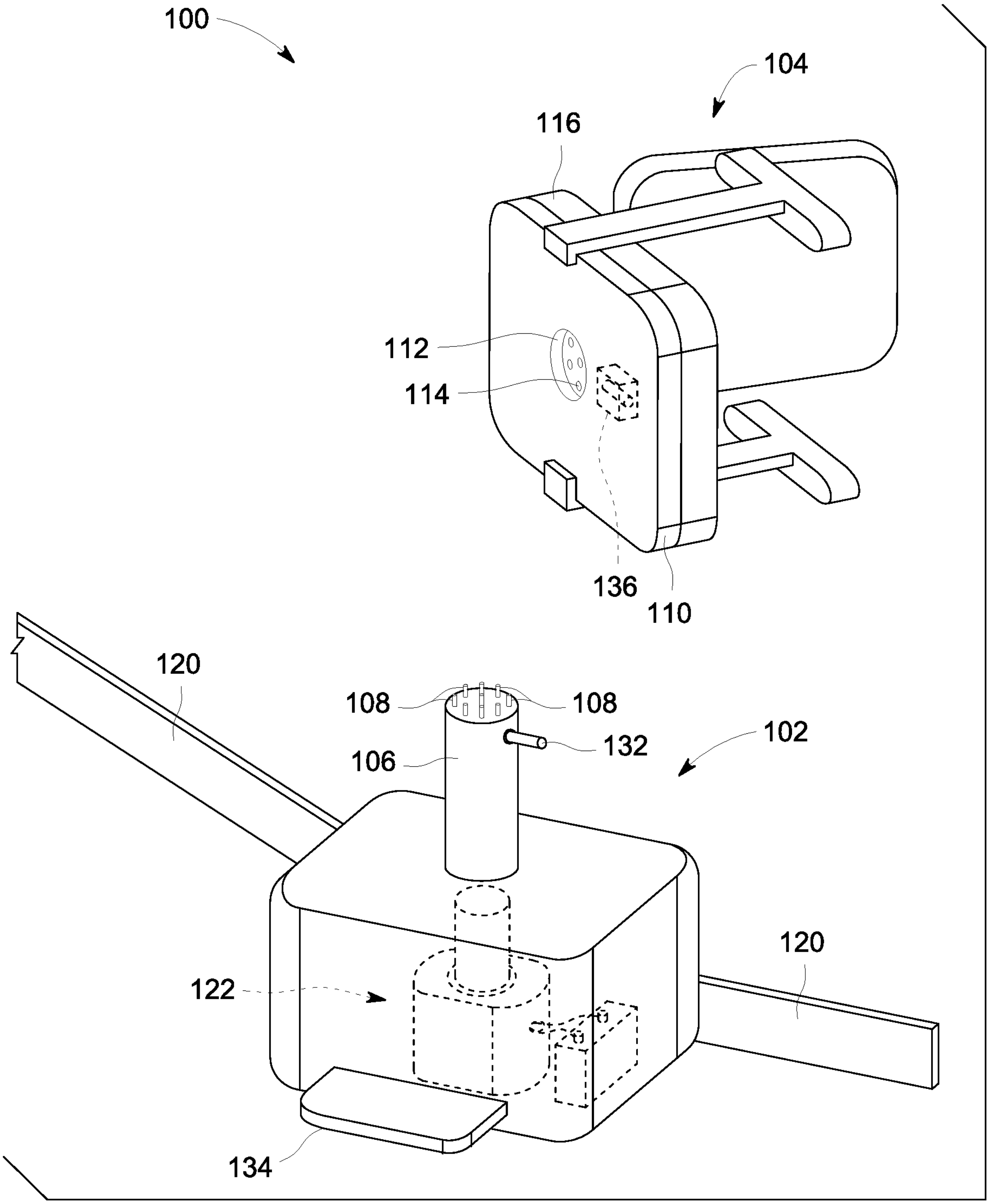
FIG. 4 illustrates an exploded view of the staircase mobility system, in accordance with an embodiment.

Referring now to FIG. 4, an exploded view of the staircase mobility system 100 is illustrated, in accordance with an embodiment. The dockable seat assembly 104 includes a dockable base 110 configured to dock or undock with the docking assembly 102. The dockable base 110 includes one or more compatible conduit 112 to engage or disengage with the one or more support rods 106. The dockable base 110 further includes one or more compatible dock connecters 114 that are disposed along the one or more compatible conduit 112. The compatible dock connecters 114 may be configured to communicatively connect or disconnect with the one or more dock connecters 108 disposed along the one or more support rods 106.

By way of an example and as described with respect to FIG. 2, the one or more dock connecters 108 may be the plurality of engagement pins spaced from each other on the one or more support rods 106. In such cases, the one or more compatible dock connecters 114 may be the plurality of corresponding engagement members configured within the one or more compatible conduit 112. By way of another example and as described with respect to FIG. 2, the one or more dock connectors 108 may be represented as the plurality of pins/contacts arranged in the plurality of rows on the one or more support rods 106. In such cases, the one or more compatible dock connecters 114 may be the plurality of corresponding members/contacts configured within the one or more compatible conduit 112. When the support rods 106 moves upward or downward, the one or more dock connecters 108 disposed along the one or more support rods may come in physical contact with the one or more compatible dock connecters 114 that are disposed along the one or more compatible conduit 112 of the dockable base (110) so as to establish communication between the dockable seat assembly 104 and the docking assembly 102.

In another embodiment, the docking assembly 102 may further include one or more securing latches 132 disposed along the one or more support rods 106. Additionally, a dockable base 110 includes one or more compatible notches 136. The one or more securing latches 132 of the docking assembly 102 may be configured to engage or disengage with the one or more compatible notches 136 of the dockable base 110 when docked or undocked, respectively. As may be appreciated, when the one or more securing latches 132 are engaged with the one or more compatible notches 136 in a docked state, the docking assembly 102 and the dockable base 110 are tightly secured. Further, when undocked, the one or more securing latches 132 are disengaged with the one or more compatible notches 136. As stated above, the forward or backward movement of the dockable seat assembly 104 along the guide rail 120, when docked to the docking assembly 102, may be suspended unless the securing latches 132 and the compatible notches 136 are engaged so as to prevent any mishap. In particular, a control on the control pad 118 (not shown in FIG. 4) for allowing movement of the docking assembly 102 on the guide rail 120 may be enabled only when the securing latches 132 are engaged with the compatible notches 136.

By way of an example, the one or more securing latches 132 may be a retractable bracket (e.g., in form of one or more bolt-like piece) on the one or more support rods 106, while the one or more compatible notches 136 may be a compatible recess (e.g., in form of one or more compatible cavity) within the one or more compatible notches 136. When the retractable bracket draws-out and locks onto the compatible recess, the one or more securing latches 132 may be considered to be engaged with the one or more compatible notches 136. As will be appreciated, the retractable bracket draws-in and disengages from the compatible recess when the dockable seat assembly 104 is undocked from the docking assembly 102.

In some embodiments, when the dockable seat assembly 104 is accurately positioned over the docking assembly 102, a sensor (not shown) may be activated to produce at least one of an audio or a visual alert for the user so as to enable the user to perform the docking operation using control pad 118. By way of an example, LED lights may be flashed in a pre-defined color (e.g., green) for the visual alert, and/or an audible alarm may be generated for the audio alert if the dockable seat assembly 104 is accurately positioned over the docking assembly 102 prior to docking. Until such alert, the user may adjust the docking assembly 102 (through a forward or a backward movement of the docking assembly 102 along the guide rail 120) or adjust the doackable seat assembly 104 (through a forward or a backward movement of the doackable seat assembly 104 along the support rail 130) so as to align the docking assembly 102 and the dockable seat assembly 104. By way of an example, the LED lights may be activated in a pre-defined color (e.g., red) during a period of misalignment. Additionally, the control on the control pad 118 for allowing docking of the docking assembly 102 with the dockable seat assembly 104 may be enabled only upon receiving an alignment notification from the sensor. It should be noted that one or more techniques may be employed to determine the alignment between the docking assembly 102 and the dockable seat assembly 104. For example, an infrared light source (not shown) installed at a center of each of the one or more support rods 106 may emit an infrared light, which may be detected by an infrared light sensor (not shown) installed in the center of each of the one or more compatible conduit 112 so as to determine a perfect alignment between the docking assembly 102 and the dockable seat assembly 104.

Figure 5:
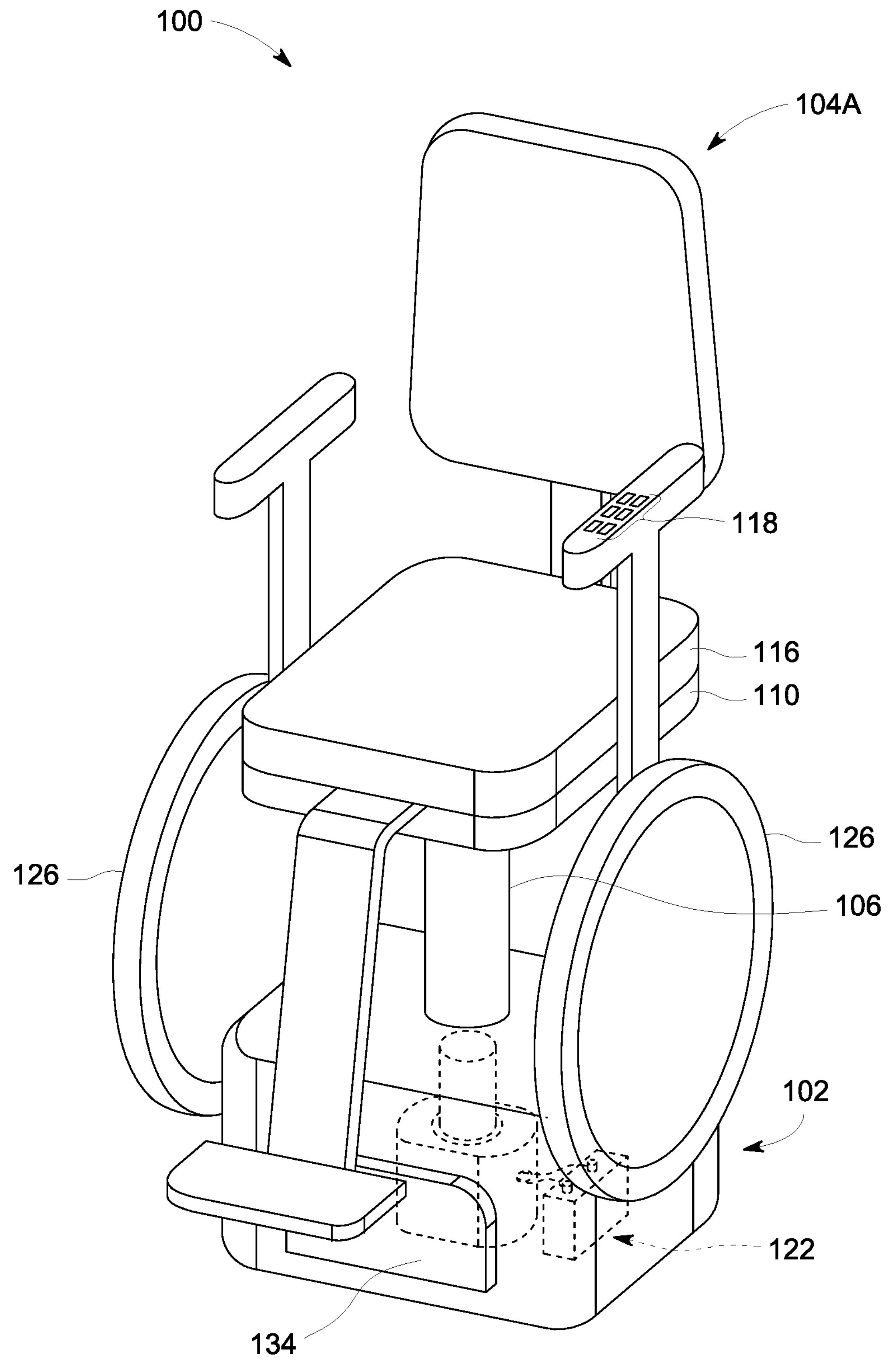
FIG. 5 illustrates a perspective view of a staircase mobility system, in accordance with another embodiment.

Referring now to FIG. 5, a perspective view of a staircase mobility system 100 is illustrated, in accordance with another embodiment. As above, the dockable seat assembly 104 may include a seat 116. The seat 116 may be disposed over the dockable base 110. The seat 116 may be a wide seat with thick padding and may have a backrest with variable settings as per preferences of the user. The seat 116 may have either a vinyl or nylon covering. In addition, the seat 116 may have a seatbelt to be used by the user during movement of the dockable seat assembly 104 over the guide rail 120. The dockable seat assembly 104 may further include a control pad 118. The control pad 118 may be accessible to the user occupying the seat 116. In an embodiment, the control pad 118 may include a plurality of input peripherals that may be operable to generate the control signals to drive the docking assembly 102 to perform a plurality of corresponding operations. The plurality of corresponding operation includes at least one of: (a) driving the docking assembly 102 along the guide rail 120 in a forward or a reverse direction, and (b) driving the docking assembly 102 to dock or undock the dockable seat assembly 104.

The control signals transmitted from the dockable seat assembly 104 may be directed to perform operations such as but not limited to docking or undocking the docking assembly 102 to the dockable seat assembly 104, moving the docking assembly 102 in a forward or a reverse direction along a guide rail 120, halting movement of the docking assembly in case of an obstruction, and so forth.

The plurality of input peripherals on the control pad 118 may include, but may be not limited to, switches, buttons, handles, joysticks, and so forth. The input peripherals may be designed so that users with arthritis, neuromuscular conditions, and general unsteady or weak ligaments may use the peripherals without discomfort or trouble. As will be appreciated, though the control pad 118 has been illustrated to be present on an arm of the dockable seat assembly 104, varied options may be provided to the user to choose where the control pad 104 is to be installed. For example, the control pad 118 may be installed on both the arms of the dockable seat assembly 104 or may be installed in form of a controller flexibly coupled to one of the arms.

Further, in the illustrated embodiment, the dockable seat assembly 104 is a dockable wheelchair assembly 104A that is capable of being driven around on a flat surface. In particular, the dockable wheelchair assembly 104A comprises a set of wheels 126 that may be configured to move the dockable wheelchair assembly 104A on the flat ground. In such embodiments, one of the operations of the control pad 118 may include raising or lowering the set of wheels 126 when docked or undocked, respectively. For example, prior to the dockable wheelchair assembly 104A being undocked, the set of wheels 126 may be brought to a level of the flat ground so that the dockable wheelchair assembly 104A may rest and move on the wheels thereafter. Similarly, after the dockable wheelchair assembly 104A is docked, the set of wheels 126 may be raised or folded so that the set of wheels do not interfere with the movement of the dockable wheelchair assembly 104A on the staircase. As will be appreciated, the set of wheels 126 may be in any configuration, and may include a pair of front wheels and a pair of rear wheels, or a pair of two side wheels, or the like.

By way of example, the dockable seat assembly 104 may have arms for ease of the user. Further, in some embodiments, the dockable base 110 along with the seat 116 and the arms of the dockable seat assembly 104 may be foldable using a lever or a switch, when not in use. In other words, the seat 116 and the arms may be flipped-up or folded-up so as avoid taking additional space.

Figure 6:
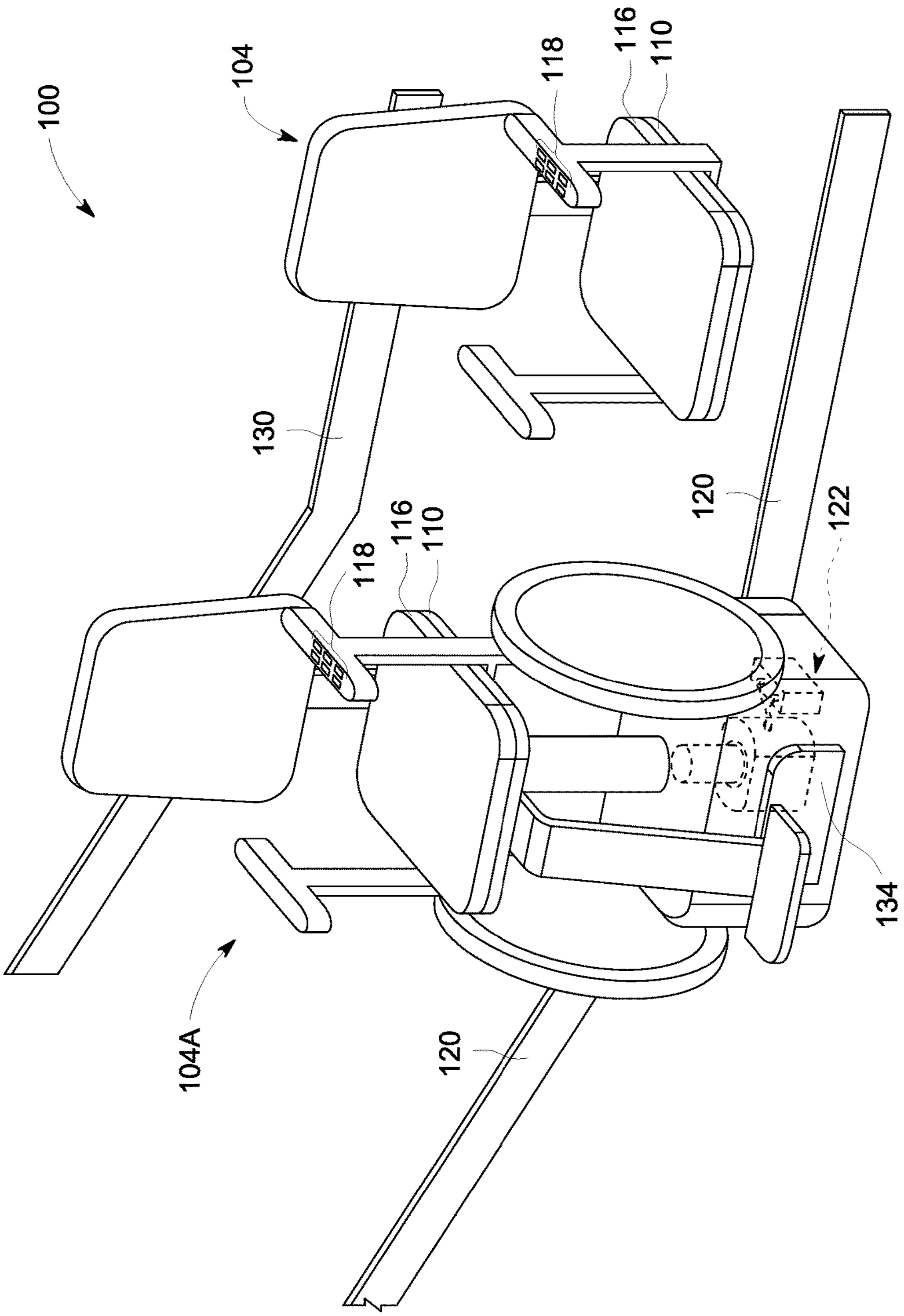
FIG. 6 illustrates a perspective view of a staircase mobility system, in accordance with yet another embodiment.

Referring now to FIG. 6, a perspective view of a staircase mobility system 100 is illustrated, in accordance with yet another embodiment. The staircase mobility system 100 may include the support rail 130 configured to be installed parallel to the guide rail 120 near the flat ground. The support rail may support the dockable seat assembly 104 when undocked from the docking assembly 102.

As an example, consider a home having installed the staircase mobility system 100 for use by a plurality of users with mobility challenges. One of the users say 'John' may be comfortable with walking on a flat surface but has challenges in climbing a staircase, and another user say 'Jim' may have extensive mobility challenges and cannot physically move around in the home. In this exemplary scenario, when the user 'John' wants to visit an upper floor of the home, he may use an already installed dockable seat assembly 104 on a docking assembly. 'John' may reach out and sit on the dockable seat assembly 104. He uses relevant controls on a control pad 118 to guide movement of the docking assembly 102 so as to travel to the next floor. The controls on the control pad 118 may transmit relevant control signals to initiate movement the docking assembly 102.

In an additional scenario, consider another user say 'Jim' who is bound by a wheelchair and wants to visit to a lower floor of the home. Considering that in this scenario, the docking assembly 102 along with the dockable seat assembly 104 is not available on the floor where 'Jim' is placed but is present on another floor. In this case, 'Jim' may use a remote control to instruct the dockable seat assembly 104 to undock from the docking assembly 102 and may further send a control signal to have the docking assembly 102 being available on a floor where 'Jim' is placed. The undocked dockable seat assembly 104 is held and supported by a support rail 130 that is installed parallel to a guide rail 120 near flat ground. It should be noted that docking and/or undocking of the dockable seat assembly 104 from the docking assembly 102 is performed when the docking assembly 102 is on a flat ground surface.

Further, upon calling the docking assembly 102, 'Jim' may dock the dockable wheelchair assembly 104A onto the docking assembly, and upon the dockable wheelchair assembly 104A being docked safely to the docking assembly, 'Jim' may instruct movement of the docking assembly 102 using the control pad 118.

Figure 7A:
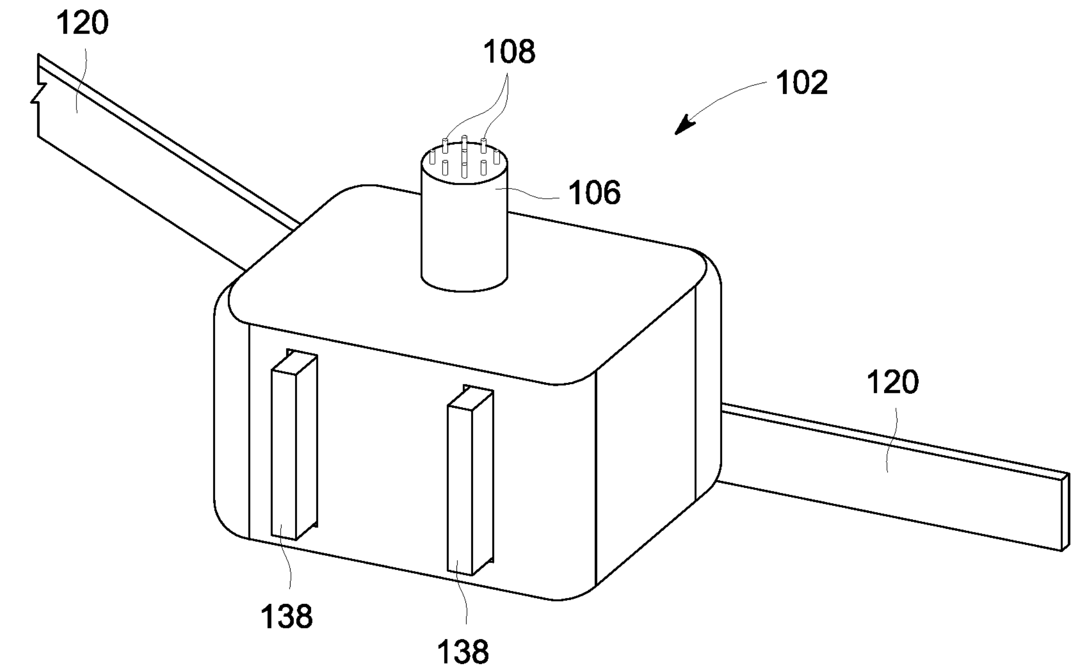
FIG. 7A illustrates a perspective view of a docking assembly, in accordance with another embodiment.

Referring now to FIG. 7A, a perspective view of the docking assembly 102 is illustrated, in accordance with another embodiment. The docking assembly 102 may include a set of support ridges 138 that may be configured to securely couple and support an external platform (not shown in FIG. 7A) with a corresponding set of compatible grooves (not shown in FIG. 7A). The external platform may be configured to support and secure a wheelchair (not shown in FIG. 7A) when secured or docked to the docking assembly 102. By way of an example, the external platform may be a wheelchair platform that may slide into or latch onto the set of support ridges 138 with the help of its corresponding set of compatible grooves. The wheelchair platform may accommodate, support and secure various types of wheelchairs. The wheelchair platform may be of varying symmetrical or asymmetrical shapes to fit any staircase. Further, the wheelchair platform may have multiple dimensions, for example, 1000 mm×800 mm, 900 mm×750 mm, or 1250 mm×800 mm. Varied dimensions of the wheelchair platform may facilitate to accommodate wheelchairs of varying types and weights.

By way of an example, the external platform may be made from solid steel parts thereby making the compatible external platform robust and secure. Additionally, the set of support ridges 138 may be arranged parallelly and the external platform may be pivoted on each of the set of support ridges 138 using the corresponding set of compatible grooves in the external platform. When the external platform is pivoted on the set of support ridges 138, the set of support ridges 138 and the corresponding set of compatible grooves may interlock amongst themselves, thereby ensuring safe movement of the external platform (and any user seated on the wheelchair) along with the docking assembly 102. Additionally, in some embodiments, the control pad 118 may be provided on the external platform such that it is accessible to a user on the wheelchair that is being carried on the external platform. In such embodiments, the set of support ridges 138 may not only act as a securing and support means, but may also act as a means of providing communication between the docking assembly 102 and the external platform. It should be noted that, any dockable seat assembly 104 may be undocked from the docking assembly 102 prior to docking the external planform to the docking assembly 102.

Figure 7B:
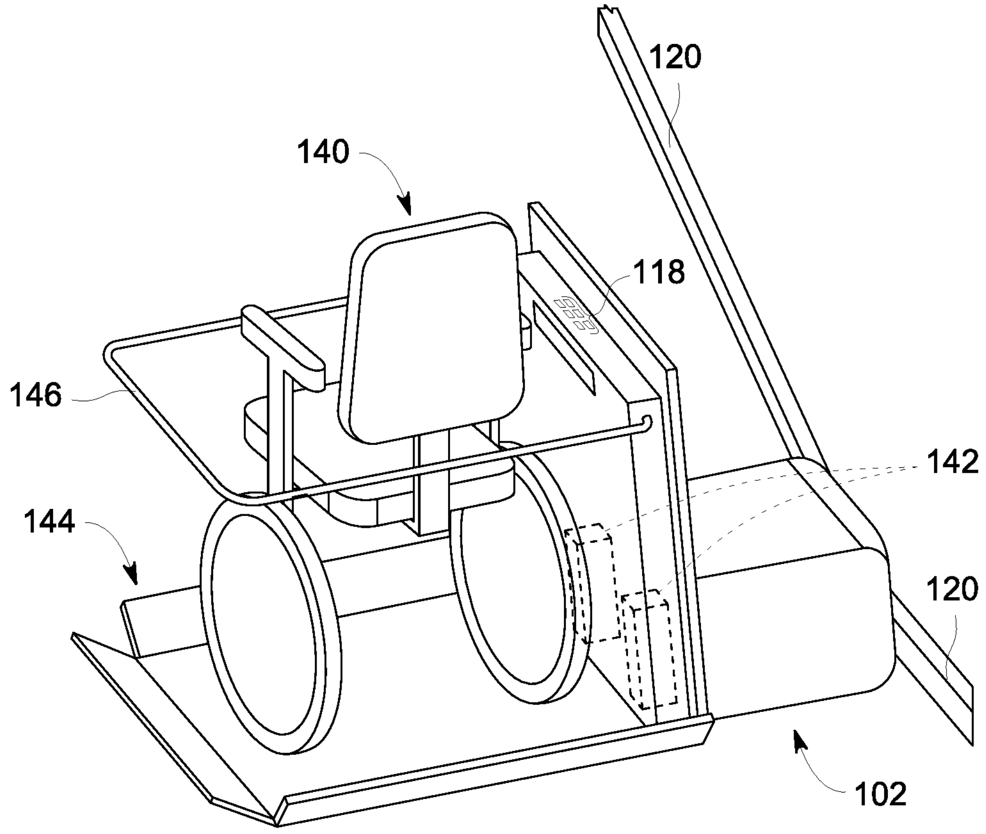
FIG. 7B illustrates a perspective view of a staircase mobility system, in accordance with yet another embodiment.

Referring now to FIG. 7B, a perspective view of the staircase mobility system 100 is illustrated, in accordance with yet another embodiment. As illustrated, an external platform 144 may be securely coupled to the docking assembly 102. The docking assembly 102 may include the set of support ridges 138 that may be configured to securely couple with a set of compatible grooves 142 within the external platform 144. The control pad 118 may be provided on the external platform so as to operate the docking assembly 102. As discussed above, the docking assembly 102 may be coupled to the drive assembly 122 that may include the motor 124. The motor 124 may configured to drive the docking assembly 102 along the guide rail 120 in a forward or reverse direction. Thus, when the external platform 144 is secured with the docking assembly 102, the motor 124 may configured to drive the external platform 144 along the guide rail 120 in a forward or reverse direction. The external platform 144 may be configured to support and secure a wheelchair 140 when secured or docked to the docking assembly 102. It should be noted that wheelchair 140 may be any wheelchair and not necessarily the dockable wheelchair 104 discussed above. The external platform 144 may further include a hinged safety bar 146 to secure the wheelchair from rolling over while ascending or descending the staircase. It should noted that when the external platform 144 is not in use, it may be decoupled or undocked from the docking assembly 102 so as to make the staircase mobility system 100 aesthetically pleasing and unobtrusive.

As will be appreciated by those skilled in the art, the above techniques relate to a staircase mobility system. The system provides for a simple yet effective way of enabling movement of people dealing with mobility restraints. The system does away with a need for wheelchair bound people to transfer from the wheelchair to a seat on a stairlift for facilitating movement. Moreover, the system takes away the need to install a wheelchair lift and the user can work with existing installed stairlift. In addition, the system is efficient and is cost coefficient, and help easing movement of people with mobility issues.

It is intended that the disclosure and examples be considered as exemplary only, with a true scope and spirit of disclosed embodiments being indicated by the following claims.

What is claimed is:

1. A staircase mobility system, comprising:

a docking assembly configured to dock or undock with a dockable seat assembly, the docking assembly comprising:

one or more support rods configured to engage or disengage with the dockable seat assembly when docked or undocked, respectively, wherein, when engaged, the one or more support rods provide support and stability to the dockable seat assembly; and a drive assembly coupled to the docking assembly, the drive assembly comprising a motor operable by a power source, the motor configured to:

drive the docking assembly along a guide rail in a forward or reverse direction, wherein the guide rail is configured to be installed substantially parallel to at least one of an incline of a staircase or a flat ground; and operate the docking assembly to dock or undock with the dockable seat assembly.

2. The staircase mobility system of claim 1, wherein the drive assembly is configured to drive the docking assembly along the guide rail based on one of:

the control signals received from the dockable seat assembly via the docking assembly, or remote control signals received from a remote control.

3. The staircase mobility system of claim 1, wherein the dockable seat assembly comprises:

a dockable base configured to dock or undock with the docking assembly, the dockable base comprising:

one or more compatible conduit to engage or disengage with the one or more support rods; and a seat disposed over the dockable base; and a control pad accessible to a user occupying the seat, the control pad comprising a plurality of input peripherals operable to generate the control signals to drive the docking assembly to perform a plurality of corresponding operations, wherein the plurality of corresponding operations comprise at least one of:

driving the docking assembly along the guide rail in the forward or the reverse direction; and driving the docking assembly to dock or undock the dockable seat assembly.

4. The staircase mobility system of claim 3, wherein the motor is configured to operate the docking assembly to dock or undock by:

moving the one or more support rods linearly within the one or more compatible conduit to engage or disengage with the dockable seat assembly.

5. The staircase mobility system of claim 3, wherein the docking assembly further comprises one or more securing latches disposed along the one or more support rods, wherein the dockable base further comprises one or more compatible notches, and wherein the one or more securing latches are configured to engage or disengage with the one or more compatible notches when docked or undocked, respectively.

6. The staircase mobility system of claim 3, wherein the dockable seat assembly is a dockable wheelchair assembly and further comprises a set of wheels configured to move the dockable wheelchair assembly on the flat ground, wherein the plurality of corresponding operations comprise raising or lowering the set of wheels when docked or undocked, respectively.

7. The staircase mobility system of claim 1, further comprising:

a support rail configured to be installed parallel to the guide rail near the flat ground, wherein the support rail supports the dockable seat assembly when undocked.

8. The staircase mobility system of claim 1, wherein the drive assembly temporarily suspends the docking assembly to dock or undock with the dockable seat assembly until the docking assembly is on a portion of the guide rail that is substantially parallel to the flat ground.

9. The staircase mobility system of claim 1, wherein the docking assembly further comprises a set of support ridges configured to securely couple with a corresponding set of compatible grooves in an external platform, and wherein the external platform is configured to support and secure a wheelchair.

10. A dockable seat assembly for a staircase mobility system, the dockable seat assembly comprising:

a dockable base configured to dock or undock with a docking assembly of the staircase mobility system, the dockable base comprising:

one or more compatible conduit to engage or disengage with one or more support rods of the docking assembly; and a seat disposed over the dockable base; and a control pad accessible to a user occupying the seat, the control pad comprising a plurality of input peripherals operable to generate control signals to drive the docking assembly to perform a plurality of corresponding operations, wherein the plurality of corresponding operations comprise at least one of:

driving the docking assembly along a guide rail in forward or reverse direction; and driving the docking assembly to dock or undock the dockable seat assembly.

11. The dockable seat assembly of claim 10, wherein the dockable seat assembly is a dockable wheelchair assembly and further comprises a set of wheels configured to move the dockable wheelchair assembly on the flat ground, wherein the plurality of corresponding operations comprise raising or lowering the set of wheels when docked or undocked, respectively.

* * * * *